United States Patent
Knauer et al.

(10) Patent No.: US 10,252,298 B2
(45) Date of Patent: Apr. 9, 2019

(54) CLASSIFYING WHEEL FOR A CENTRIFUGAL-FORCE AIR CLASSIFIER

(71) Applicant: HOSOKAWA ALPINE Aktiengesellschaft, Augsburg (DE)

(72) Inventors: Dominik Knauer, Angsburg (DE); Karl Herman Kraus, Augsburg (DE); Horst Skirde, Augsburg (DE)

(73) Assignee: HOSOKAWA ALPINE AKTIENGESELLSCHAFT, Augsburg (DE)

( * ) Notice: Subject to any disclaimer, the term of this patent is extended or adjusted under 35 U.S.C. 154(b) by 0 days.

(21) Appl. No.: 15/832,294

(22) Filed: Dec. 5, 2017

(65) Prior Publication Data
US 2018/0169706 A1 Jun. 21, 2018

(30) Foreign Application Priority Data
Dec. 16, 2016 (DE) .......... 10 2016 015 051

(51) Int. Cl.
*B07B 7/08* (2006.01)
*B07B 7/083* (2006.01)
(Continued)

(52) U.S. Cl.
CPC .......... *B07B 7/083* (2013.01); *B01D 45/14* (2013.01); *B07B 7/02* (2013.01)

(58) Field of Classification Search
CPC .. B07B 7/02; B07B 7/08; B07B 7/083; B07B 7/086; B01D 45/12; B01D 45/14; B01D 45/16
See application file for complete search history.

(56) References Cited

U.S. PATENT DOCUMENTS 2,206,981 A * 7/1940 Sturtevant ............... B07B 7/083
209/139.2
3,770,124 A * 11/1973 Frangquist ............... B07B 7/08
209/139.2
(Continued)

FOREIGN PATENT DOCUMENTS

DE 291871 C 5/1916
DE 34 25 101 A1 1/1986
(Continued)

OTHER PUBLICATIONS

Search Report for German Application No. 10 2016 015 051.3, filed Dec. 16, 2016.
(Continued)

*Primary Examiner* — Joseph C Rodriguez
(74) *Attorney, Agent, or Firm* — Paul D. Bianco; Katharine Davis; Fleit Gibbons Gutman Bongini & Bianco PL

(57) ABSTRACT

A classifying wheel for a centrifugal-force air classifier where the flow pattern of the classifying air is contrary to its centrifugal direction, namely centripetal, and which is equipped with extensions fitted to the classifying wheel vanes within the flow channels which influence the flow pattern is to be executed in wear-protected design. This is achieved in that the classifying wheel has at least one reinforcing ring which has uniformly spaced hooks arranged around its periphery which fix the classifying wheel vanes to the extensions so that the outside radial edge of the classifying wheel vanes is not in contact with the reinforcing ring.

15 Claims, 3 Drawing Sheets

(51) Int. Cl.
    *B01D 45/14*     (2006.01)
    *B07B 7/02*     (2006.01)

(56) References Cited

U.S. PATENT DOCUMENTS

| | | | | |
|---|---|---|---|---|
| RE33,085 E | * | 10/1989 | Petersen | B01D 45/12 |
| | | | | 55/327 |
| 5,120,431 A | * | 6/1992 | Cordonnier | B07B 7/083 |
| | | | | 209/135 |
| 5,377,843 A | | 1/1995 | Schumacher | |
| 6,189,821 B1 | * | 2/2001 | James | B02C 7/12 |
| | | | | 241/297 |
| 7,028,931 B2 | * | 4/2006 | Lin | B02C 13/04 |
| | | | | 209/134 |
| 7,913,851 B2 | * | 3/2011 | Chang | B02C 15/003 |
| | | | | 209/139.1 |
| 8,033,399 B2 | * | 10/2011 | Pistorius | B07B 7/083 |
| | | | | 209/142 |
| 8,231,007 B2 | | 7/2012 | Wark | |
| 8,353,408 B2 | * | 1/2013 | Ito | B07B 7/083 |
| | | | | 209/134 |
| 8,714,359 B2 | * | 5/2014 | Aizawa | B02C 23/12 |
| | | | | 209/142 |
| 9,022,222 B2 | * | 5/2015 | Devroe | B07B 4/04 |
| | | | | 209/139.1 |

FOREIGN PATENT DOCUMENTS

| | | |
|---|---|---|
| DE | 4140656 C1 | 9/1992 |
| DE | 295 05 311 U1 | 6/1995 |
| DE | 295 05 311 | 7/1995 |
| DE | 19613902 A1 | 10/1997 |
| DE | 198 40 344 A1 | 5/2000 |
| DE | 19840344 A1 | 5/2000 |
| DE | 20 2008 012076 U1 | 11/2008 |
| WO | 94/12290 A1 | 6/1994 |

OTHER PUBLICATIONS

European Search Opinion for European Application No. 17 00 1985, filed Dec. 16, 2017, 15 pages (with machine language translation).
German Search Report for Application No. 10 2016 015 051.3, filed Dec. 16, 2016, 1 page.
European Search Report dated Apr. 26, 2018, for EP 17 00 1985, filed Dec. 16, 2017, 3 pages.
German Office Action dated Oct. 25, 2017 for Application No. 10 2016 015 051.3, 3 pages (with machine language translation).

* cited by examiner

CLASSIFYING WHEEL FOR A CENTRIFUGAL-FORCE AIR CLASSIFIER

FIELD OF THE INVENTION

The invention concerns a classifying wheel for a centrifugal-force air classifier where the flow pattern of the classifying air is contrary to its centrifugal direction, namely centripetal, and which is equipped with classifying wheel vanes arranged much like a crown between an annular hub plate which supports the classifying wheel hub and an annular cover plate, whereby flow channels are formed between the classifying wheel vanes as the result of the faces of the classifying wheel vanes being spaced at a distance to each other and running in the direction of the rotational axis as well as the extensions fitted to the classifying wheel vanes within the flow channels which influence the flow pattern.

BACKGROUND

Air classifiers serve to separate (classify) the feed material dispersed in a fluid into a fine and a coarse fraction. The separation effect of a classifying wheel of the given type is based on the fact that the centripetal force of the fluid and the centrifugal force in the flow channels between the classifying wheel vanes of the so-called deflector wheel affect the individual particles of the product in opposite directions. With small particles, the centripetal force predominates so that the particles become entrained in the fluid and are discharged as fines. In the case of large particles, the centrifugal force predominates so that they are catapulted against the fluid flow out of the deflector wheel. The particle size where the centrifugal force and centripetal force are in equilibrium, i.e. where the particles have the same probability of entering the fine or the coarse fraction, is called the cut point size.

The demands regarding the classification of bulk materials are increasing constantly. Increasingly high amounts of bulk materials are meanwhile being classified. And the demands placed on the classification results are also becoming higher and higher. It is not enough these days for the classification to be economically efficient, a high cut point and yield are also demanded.

One of the problems encountered when classifying abrasive products is the wear to the classifying wheels and especially to the classifying wheel vanes.

In the case of extremely small classifying wheels, exchange of the complete classifying wheel is still acceptable because classifying wheels are used which are in one-piece design and which consist of one single sintered material such as ceramic, as disclosed in German patent DE 41 40 656 A1.

With larger classifying wheels, exchangeable classifying wheel vanes are employed. This makes for inexpensive servicing of the worn classifying wheels, because it is not the complete classifying wheel which needs exchanging but rather only the worn classifying wheel vanes. The classifying wheel vanes are preferably made of wear-resistant ceramic materials. This type of classifying wheel is disclosed in German patent DE 196 13 902 A.

In order to achieve the sharpest possible separation into a fine fraction and a coarse fraction, it is essential that a constant flow pattern at a uniform average radial speed of the fluid is present in all the flow channels between the classifying wheel vanes. If this is not possible, classifying wheels with extensions are employed, as are disclosed in German patent DE 198 40 344 A. The extensions are installed inside the flow channels between two classifying wheel vanes. The extensions prevent undesirable turbulence inside the flow channels, even if an undirected flow is present at the outer periphery of the classifying wheel. As a result of the complex design of these classifying wheels and the desired operating speeds, a wear-protected classifying wheel design has not yet been employed.

SUMARRY OF THE INVENTION

One aspect of the invention relates to a solution which makes a design of classifying wheel possible with extensions which are low in wear and which influence the flow pattern.

In an embodiment, the invention-design classifying wheel has at least one reinforcing ring located between the annular hub plate and the annular cover plate which has uniformly spaced hooks arranged around the periphery which fix the classifying wheel vanes to the extensions so that the outside radial edge of the classifying wheel vanes is free of the reinforcing ring.

DESCRIPTION OF THE INVENTION

The classifying wheel comprises three components, namely the classifying wheel subassembly, the outside classifying wheel vanes and the annular cover plate. The classifying wheel subassembly has an annular hub plate with a classifying wheel hub, inside classifying wheel vanes and an annular end plate. In its central zone downstream of the classifier hub, the hub plate accommodates the inside classifying wheel vanes arranged radially in a ring. The annular end plate of the basic subassembly is located on the side of the inside classifying wheel vanes that opposes the hub plate. The components of the basic subassembly are permanently connected with each other, e.g. by soldering or welding. The inside classifying wheel vanes have different radial vane widths across the axial classifying wheel height.

The hub plate and the cover plate have slots arranged in a ring around the periphery into which the outside classifying wheel vanes are inserted and fixed. The cover plate is connected to the classifying wheel subassembly, e.g. by means of screws, to be removable. Due to this design, the outside classifying wheel vanes are of the plug-in type. The outside classifying wheel vanes can also be at a radial angle so that the inside and outside classifying wheel vanes are at a different angle to the radial direction of the classifying wheel. Alternatively, the inside and outside classifying wheel vanes can also be at the same angle to the radial direction of the classifying wheel.

To stabilise and reinforce the classifying wheel, one or several reinforcing rings are provided. They are distributed over the height of the classifying wheel. On the same height as the reinforcing ring, the inside classifying wheel vanes have recesses into which the reinforcing ring is inserted. The inside classifying wheel vanes and the reinforcing ring are permanently connected together. The reinforcing ring has hooks distributed evenly around its periphery. The number of hooks matches the number of classifying wheel vanes. The hooks serve to hold the outside classifying wheel vanes in place and to intercept the active forces. To ensure that the hooks can support the outside classifying wheel vanes, the outside classifying wheel vanes have corresponding extensions in the radial inside zone of the vane width. The extensions extend over the entire height of the outside classifying wheel vanes. The hooks of the reinforcing ring and the extensions of the classifying wheel vanes engage positively with each other.

Due to this design, the radial outside edge of the classifying wheel vane is free of the reinforcing ring so that it is the wear-protected classifying wheel vanes which are subjected to wear, but not the reinforcing ring.

In comparison with the hub plate and cover plate as well as the outside classifying wheel vanes, the reinforcing ring is radially offset towards the inside in order to reduce the wear to the radial outside edge of the reinforcing ring caused by the dominant impact.

Because the outside classifying wheel vanes are exposed to high wear, they are in wear-protected design.

The outside classifying wheel vanes can consist entirely of an anti-wear material. In this case, they are made of anti-wear materials such as ceramic, tungsten carbide, metal alloys or plastic.

The outside classifying wheel vanes can consist partially of an anti-wear material. In this case, the classifying wheel vane base is provided with a plate or with several small plates located next to each other made of the anti-wear material. This anti-wear material is applied to the side of the classifying wheel vanes which lie at the front when seen in the rotational direction of the classifying wheel. These wear-protection plates extend from the front edge of the classifying wheel vane to the extension in the radial inside zone of the vane width over the entire height of the vane. The extension itself has no wear-protection elements. The wear protection can also encompass the radial front narrow edge of the classifying wheel vanes. The following materials are used for the wear-protection plates: ceramic, plastic or tungsten carbide. The wear-protection plates or small plates can be bonded, soldered or screwed to the vane base.

As an alternative, the surface of the classifying wheel vanes can be hardened using methods such as boronising or nitriding. Another method is build-up welding, especially laser deposition welding of the surface of the classifying wheel vanes using low-wear materials. In this case, materials such as tungsten carbide and hard materials with binder such as tungsten or chromium carbide are used. Over and above this, thermal spray processes can also be employed.

The extension to the outside classifying wheel vanes in the radial inside zone of the vane width can have many different shapes, e.g. the shape of a triangle, rectangle, square or polygon. It can also be stepped.

Due to this design of the classifying wheel, the outside classifying wheel vanes are of the plug-in type and can thus be adapted as far as the wear material goes to suit the material to be classified. This design also permits the classifying wheel vanes to be exchanged. The classifying wheel vanes can be exchanged without having to remove the classifying wheel from the classifier by merely removing the cover plate from the classifying wheel and then pulling out and exchanging the outside classifying wheel vanes.

In view of the fact that the classifying wheel consists of the three components basic subassembly with hub plate and with inside classifying wheel vanes, cover plate and outside classifying wheel vanes, it is not necessary to exchange the complete classifying wheel but rather only to exchange the individual wear parts as and when required.

This design makes it possible to combine high-wear and low-wear materials such as steel with ceramic, tungsten carbide and plastic.

It usually suffices to manufacture the outside classifying wheel vanes so that they are protected against wear on one side. The reinforcing ring does not need to be in wear-protected design because it is offset towards the inside and is thus not subject to a high degree of wear.

If the wear to the classifying wheel caused by the feed product is nevertheless too high, the basic subassembly, the cover plate and the reinforcing ring can also be in wear-protected design. The type of wear protection can be adapted to suit the individual components of the classifying wheel and their wear capacity. If the feed product is not very abrasive, the classifying wheel vanes can also be made of steel. For the event that wear appears on the side of the classifying wheel vanes facing away from the rotational direction, they can also be in wear-protected design.

This design of the classifying wheel vanes permits materials such as CRP, GRP, polymers and others to be selected as the construction material for the classifying wheel vane bases. Alternatively, the classifying wheel vane base can also be made of a cast material. Furthermore, additive manufacturing can also be employed.

The extensions to the outside classifying wheel vanes constitute fittings as disclosed in German patent DE 198 40 344 A. They are intended to prevent undesirable turbulence developing inside the flow channels between the classifying wheel vanes, even if an undirected flow is present at the outer periphery of the classifying wheel.

The geometry of the outside classifying wheel vanes with the extension over the entire vane height in the radial inside zone of the vane width contributes towards reinforcing the classifying wheel vanes so that they can withstand the centrifugal forces at high classifying wheel speeds and in combination with the reinforcing ring, can absorb the centrifugal forces. Besides this, the reinforcing ring prevents the outside classifying wheel vanes from bending and moving in radial direction.

The extensions thus have three functions:
flow control of the classifying air between the classifying wheel vanes;
to reinforce the classifying wheel vanes;
as a contact point for the hooks of the reinforcing ring to hold the classifying wheel vanes.

Because the cover plate is screwed to the classifying wheel subassembly, the use of different screws can help to counter any imbalance that may occur.

BRIEF DESCRIPTION OF THE DRAWINGS

Other details, features and advantages of the subject matter of the invention arise from the subclaims and from the following description of the associated drawings in which a preferred design of the invention is shown by way of example. The drawings show:

DETAILED DESCRIPTION

Figure 1:
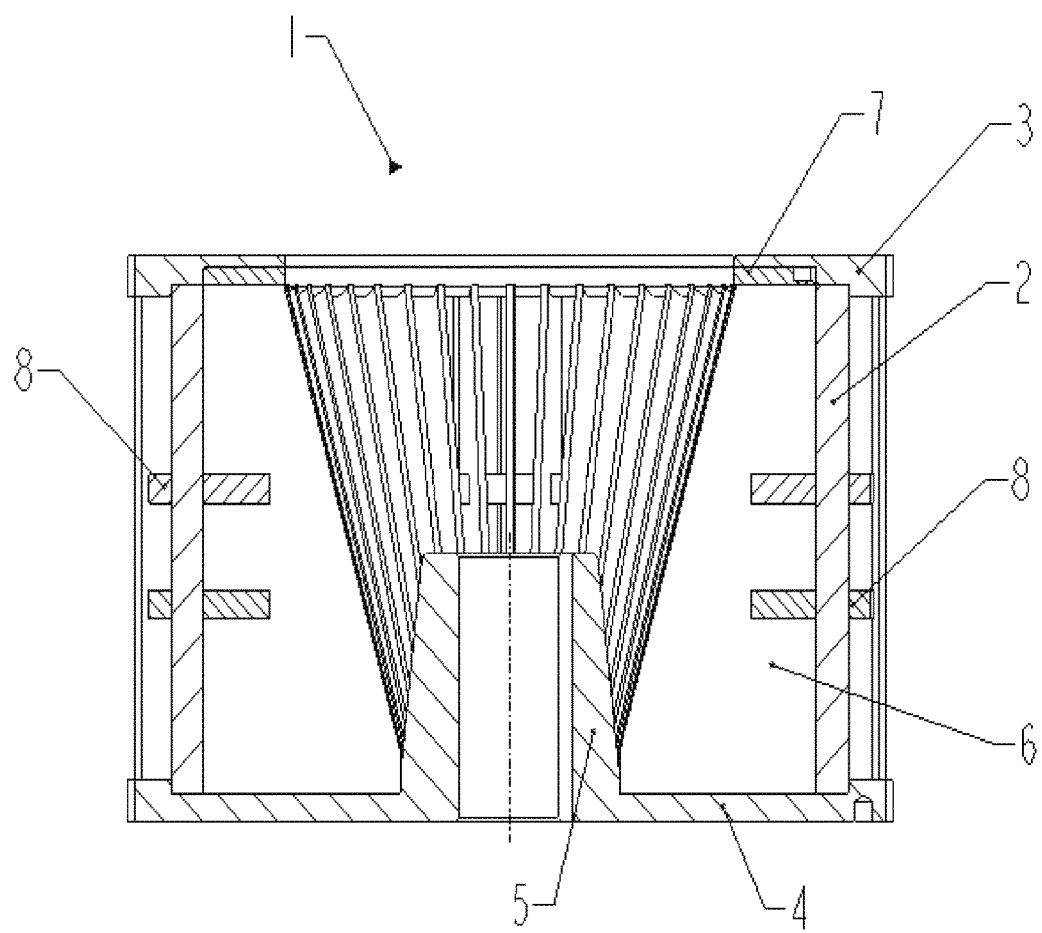
FIG. 1 A cross-sectional view of an invention-design classifying wheel

FIG. 1 shows the invention-design classifying wheel 1 for an air classifier. It comprises the classifying wheel subassembly, outside classifying wheel vanes 2 and an annular cover plate 3. The classifying wheel subassembly consists of the annular hub plate 4, the classifying wheel hub 5, the inside classifying wheel vanes 6 and the annular end plate 7 of the classifying wheel subassembly. These parts are permanently connected to each other.

The inside classifying wheel vanes 6 are spaced evenly and radially around the classifying wheel hub 5 and are held in slots in the hub plate 4. On the side opposite the hub plate 4, the inside classifying wheel vanes 6 are fixed in place by means of an end plate 7. The inside classifying wheel vanes 6 are trapezoidal in shape. The outside classifying wheel vanes 2 are arranged adjacent to the inside classifying wheel vanes 6 in radial outside direction. Their number is identical to that of the inside classifying wheel vanes 6 and they are also spaced evenly. They are inclined in radial direction so that the inside and outside classifying wheel vanes display a different angle to the radial direction of the classifying wheel. The outside classifying wheel vanes 2 are inserted and held in slots or guideways in the hub plate 4 and the cover plate 3. The cover plate 3 is screwed to the basic subassembly.

In the invention-design example, the classifying wheel 1 has two reinforcing rings 8. They are both arranged equidistant from the cover plate 3 and the hub plate 4 and at a distance from each other. In another invention design not shown here, the distance between the cover plate 3, the hub plate 4 and the two reinforcing rings 8 is identical.

The reinforcing rings 8 are mounted in recesses on the inside classifying wheel vanes 6.

Figure 2:
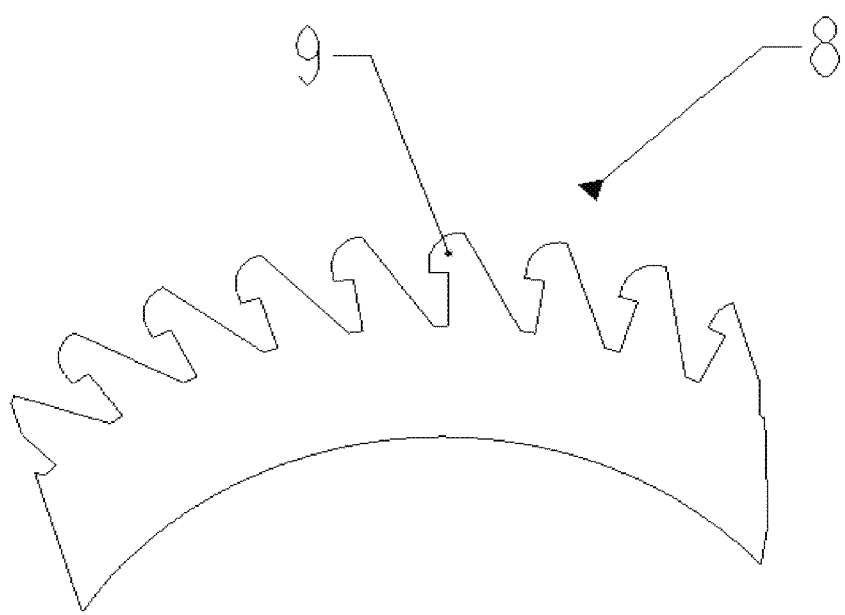
FIG. 2 A section of the reinforcing ring

FIG. 2 shows a section of the reinforcing ring 8 of the classifying wheel. The reinforcing ring 8 has hooks 9 distributed and evenly around its periphery radially to the outside. The number of hooks 9 matches the number of classifying wheel vanes. The outside classifying wheel vanes 2 have extensions 10. These extensions 10 are arranged in the radial inside zone of the classifying wheel vanes over the height of the vanes. The hooks 9 of the reinforcing ring and the extensions 10 of the outside classifying wheel vanes 2 engage positively with each other, in this way the outside classifying wheel vanes 2 are held by the hooks 9 of the reinforcing ring 8. The diameter of the reinforcing ring 8 is smaller than the diameter of the cover plate 3 and hub plate 4. The diameter described by the hooks 9 is smaller than the diameter described by the radial outside edges of the classifying wheel vanes 2. This means that the reinforcing ring 8 is outside the dominant impact stress zone and is thus subject to minimal wear.

Figure 3A:
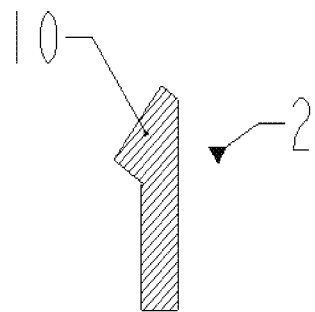
FIGS. 3a, 3b, and 3c Profiles of the outside classifying wheel vane

FIG. 3a shows a cross-section through an outside classifying wheel vane 2. The classifying wheel vane 2 has an almost rectangular profile and exhibits an extension 10 at one end. In installed condition, this extension of the classifying wheel vane is located at the radial inside zone of the vane. Polygon-shaped in profile, this extension 10 extends over the entire height of the classifying wheel vane 2. These classifying wheel vanes 2 are made completely of one single material such as a wear-proof material (ceramic or tungsten carbide). Because the outside classifying wheel vanes 2 are inclined at an angle, the radial inside edge of the classifying wheel vane 2 has an angle to permit abutting the inside classifying wheel vane 6 with a positive fit.

Figure 3B:
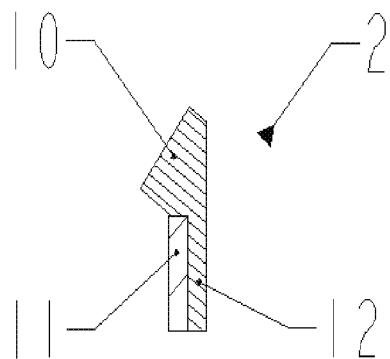

FIG. 3b shows an outside classifying wheel vane 2 in profile which has the same shape as the outside classifying wheel vane 2 from FIG. 3a, but is not made completely of one single wear-proof material. The classifying wheel vane comprises the classifying wheel vane base and the wear protection. The wear protection is realised here by means of a wear plate 11 made of wear-proof material. The wear plate 11 extends over the entire height of the outside classifying wheel vane from the edge to the extension 10. The area of the actual extension 10 has no wear plate so that the hooks 9 of the reinforcing ring 8 can engage in the extension 10 in a positive manner. Alternatively, the top and bottom area of the classifying wheel vane that are accommodated in the slots of the cover plate and hub plate can be without a wear-protection plate. The wear-protection plate is bonded to the classifying wheel vane. In a different invention design, the wear plate is soldered or welded on. The wear protection can also consist of several small plates arranged next to each other.

Figure 3C:
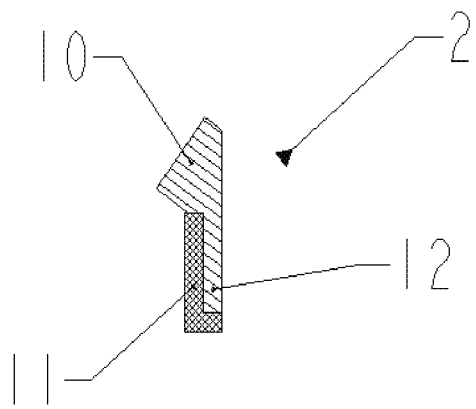

FIG. 3c shows another design of the wear protection for the outside classifying wheel vanes 2. In addition to the wear plate 11, a wear-proof material is applied also to the radial outside edge of the outside classifying wheel vane.

REFERENCE NUMBER LISTING

Classifying wheel 1
Outside classifying wheel vanes 2
Cover plate 3
Hub plate 4
Classifying wheel hub 5
Inside classifying wheel vanes 6
End plate 7
Reinforcing ring 8
Hook 9
Extension 10
Wear plate 11
Classifying wheel vane base 12

What is claimed is:

1. A classifying wheel for a centrifugal-force air classifier, the classifying wheel comprising:
   a hub;
   an annular hub plate supporting the hub;
   an annular cover plate;
   classifying wheel vanes arranged radially around the hub between the annular hub plate and the annular cover plate, each classifying wheel vane having a face tilted at an angle to a rotational axis of the classifying wheel and an extension extending over an edge of the classifying wheel vane;
   flow channels configured for centripetal air flow formed between the classifying wheel vanes by the faces and the extensions of the classifying wheel vanes;
   at least one reinforcing ring positioned between the annular hub plate and the annular cover plate; and
   a plurality of hooks positioned uniformly around a periphery of the at least one reinforcing ring, each hook of the plurality of hooks engaging the extension of a classifying wheel vane such that radial outside edges of the classifying wheel vanes are free of the at least one reinforcing ring.

2. The classifying wheel according to claim 1, wherein the plurality of hooks engages positively with the extensions of the classifying wheel vanes.

3. The classifying wheel according to claim 1, wherein the extensions of the classifying wheel vanes are configured to reinforce the classifying wheel vanes and to control the centripetal air flow in the flow channels.

4. The classifying wheel according to claim 1, wherein the at least one reinforcing ring is configured to absorb centrifugal force generated by rotation of the classifying wheel through connection of the plurality of hooks with the extensions of the classifying wheel vanes.

5. The classifying wheel according to claim 1, wherein a diameter of the at least one reinforcing ring is smaller than a diameter of the annular hub plate and the annular cover plate.

6. The classifying wheel according to claim 1, wherein the classifying wheel vanes comprise pairs of inside classifying wheel vanes and outside classifying wheel vanes.

7. The classifying wheel according to claim 6, wherein the extensions are part of the outside classifying wheel vanes.

8. The classifying wheel according to claim 7, wherein the extensions are located in a radial inside zone of a width of the outside classifying wheel vanes.

9. The classifying wheel according to claim 6, wherein the inside classifying wheel vanes and outside classifying wheel vanes are at different angles to a radial direction of the classifying wheel.

10. The classifying wheel according to claim 6, wherein the outside classifying wheel vanes are inserted into guideways between the annular hub plate, the annular cover plate, and the plurality of hooks of the at least one reinforcing ring.

11. The classifying wheel according to claim 6, wherein the outside classifying wheel vanes are partially or completely protected against wear.

12. The classifying wheel according to claim 11, wherein surfaces of the outside classifying wheel vanes are partially or completely treated for protection against wear.

13. The classifying wheel according to claim 11, wherein the outside classifying wheel vanes are at least partially made of an anti-wear material selected from the group consisting of ceramic, tungsten carbide, metal alloys, and plastic.

14. The classifying wheel according to claim 6, wherein the outside classifying wheel vanes include wear-protection plates, the wear-protection plates fitted in a rotational direction to a front side of the outside classifying wheel vanes and extending over height and width of the outside classifying wheel vanes to the extensions such that the extensions do not contact the wear-protection plates.

15. The classifying wheel according to claim 14, wherein the wear-protection plates cover the radial outside edges of the outside classifying wheel vanes.

* * * * *